(12) United States Patent
Lee et al.

(10) Patent No.: US 7,662,508 B2
(45) Date of Patent: Feb. 16, 2010

(54) SECONDARY BATTERY MODULE

(75) Inventors: Gun-Goo Lee, Suwon-si (KR);
Tae-Yong Kim, Suwon-si (KR);
Yoon-Cheol Jeon, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 736 days.

(21) Appl. No.: 11/289,133

(22) Filed: Nov. 28, 2005

(65) Prior Publication Data

US 2006/0115721 A1    Jun. 1, 2006

(30) Foreign Application Priority Data

Nov. 30, 2004  (KR) ................... 10-2004-0099318
Oct. 10, 2005  (KR) ................... 10-2005-0094902

(51) Int. Cl.
*H01M 10/50*  (2006.01)
*H01M 2/10*   (2006.01)

(52) U.S. Cl. ................. 429/120; 429/148; 429/157

(58) Field of Classification Search ............ 429/120, 429/148, 157, 159
See application file for complete search history.

(56) References Cited

U.S. PATENT DOCUMENTS

| | | | | |
|---|---|---|---|---|
| 3,664,877 A | * | 5/1972 | Shaw | 429/120 X |
| 5,456,994 A | * | 10/1995 | Mita | 429/120 X |
| 5,589,290 A | | 12/1996 | Klink et al. | |
| 6,761,992 B1 | * | 7/2004 | Marukawa et al. | 429/159 X |

FOREIGN PATENT DOCUMENTS

| | | |
|---|---|---|
| JP | 05-190213 | 7/1993 |
| JP | 07-201371 | 8/1995 |
| JP | 07-272768 | 10/1995 |
| JP | 2000-067934 | 3/2000 |
| JP | 2001-023702 | 1/2001 |
| JP | 2001-35461 | 2/2001 |
| JP | 2001-167806 | 6/2001 |
| JP | 2001-319697 | 11/2001 |
| JP | 2004-158393 | 6/2004 |
| KR | 10-2006-0037606 | 5/2006 |

OTHER PUBLICATIONS

Patent Abstracts of Japan for Publication No. 07-201371; Date of publication of application Aug. 4, 1995, in the name of Sugiyama Hiroshi et al.
Patent Abstracts of Japan for Publication No. 2000-067934; Date of publication of application Mar. 3, 2000, in the name of Kiba Hisashi.

(Continued)

*Primary Examiner*—Stephen J. Kalafut
(74) *Attorney, Agent, or Firm*—Christie, Parker & Hale, LLP

(57) ABSTRACT

A secondary battery module includes at least more than two battery aggregates having a plurality of unit batteries continuously arranged, and a housing receiving the battery aggregates, wherein, with respect to the arrangement direction of the unit batteries, each of the unit batteries of each of the battery aggregates is disposed in an oblique direction against the arrangement direction of the unit batteries.

24 Claims, 10 Drawing Sheets

OTHER PUBLICATIONS

Patent Abstracts of Japan for Publication No. 2004-158393; Date of publication of application Jun. 3, 2004, in the name of Sugimoto Tomonaga et al.

European Search Report, dated Apr. 6, 2006, for Application No. 05111494.0, in the name of Samsung SDI Co., Ltd.

Patent Abstracts of Japan for Publication No.: 05-190213; Date of publication of application Jul. 30, 1993, in the name of Rainer et al.

Patent Abstracts of Japan for Publication No.: 2001-023702; Date of publication of application Jan. 26, 2001, in the name of Eto Toyohiko.

Patent Abstracts of Japan, Publication No. 2001-035461; Date of Publication: Feb. 9, 2001; in the name of Hiroaki Yoshida et al.

Patent Abstracts of Japan, Publication No. 2001-167806; Date of Publication: Jun. 22, 2001; in the name of Toyohiko Eto.

Korean Patent Abstracts, Publication No. 1020060037606 A; Date of Publication: May 3, 2006; in the name of Gun Goo Lee et al.

* cited by examiner

SECONDARY BATTERY MODULE

CROSS REFERENCES TO RELATED APPLICATION

This application claims priority to and the benefit of Korean Patent Application Nos. 10-2004-0099318 filed on Nov. 30, 2004, and 10-2005-0094902 filed on Oct. 10, 2005, both applications filed in the Korean Intellectual Property Office, the entire contents of which are incorporated herein by reference.

FIELD OF THE INVENTION

The present invention relates to a secondary battery module, and more particularly, to an improved arrangement structure of unit batteries for a secondary battery module.

BACKGROUND OF THE INVENTION

Unlike a primary battery, the secondary battery may be recharged. Lower power batteries are used for various portable electronic devices such as cellular phones, laptop computers, and camcorders. Bulk size batteries are used as the power source for motor drive, such as in hybrid electric vehicles.

Depending on the external shape, secondary batteries may be classified into different types, for example, square and cylindrical batteries. When they are used for motor drive of the machines requiring a high power source such as the hybrid electric vehicles, the secondary batteries (hereinafter "unit battery") may form a secondary battery module of high power.

When the secondary battery module is used for motor drive of the vacuum cleaners, motor scooters, or vehicles (electric vehicles or hybrid electric vehicles), a large number of unit batteries are arranged in multiple rows. Accordingly, when assembling the secondary battery module, it is important to arrange the unit batteries to increase the cooling efficiency for unit batteries.

In addition to the cooling efficiency for the unit batteries, when assembling the secondary battery module, it is also important not to increase the size of the secondary battery module.

In details, if the secondary battery module has multiple battery rows (battery row means an aggregate structure in which a plurality of unit batteries are arranged in a row), each battery row is stacked in multiple layers or arranged side by side in a plane. However, the multiple layer structure has a problem in that the overall size of the module is increased as the height of the secondary battery module is increased.

In the meantime, if each battery row is arranged side by side in a plane, the size of the module can be minimized. However, there are problems in that the cooling efficiency for the unit batteries is lowered, and the temperature deviation occurs to cause non-uniform cooling.

This is because, if battery rows are arranged side by side, after passing through the unit batteries in one side battery row, the cooling medium passes through the unit batteries in the other side battery row. This causes the difference of the cooling medium flowed into each battery row.

That is, as the cooling medium passes through one side battery row, the temperature is increased by heat exchange. Then, the other side battery row is cooled by this cooling medium with the increased temperature, and accordingly, there is a big difference between the temperature of the one side battery row and the temperature of the other side battery row.

Therefore, if the battery rows are arranged side by side, as the heat generated from each of the unit batteries in the battery rows is not uniformly discharged, the unit battery's own performance is lowered, and thereby the secondary battery module can not be used for motor drive requiring high power.

SUMMARY OF THE INVENTION

In accordance with the present invention, a secondary battery module is provided which has efficient arrangement of unit batteries not only to enhance heat emission efficiency but also to minimize its size.

According to one aspect of the present invention, a secondary battery module comprises at least more than two battery aggregates having a plurality of unit batteries continuously arranged, and a housing receiving the battery aggregates, wherein, with respect to the arrangement direction of the unit batteries, each of the unit batteries of each of the battery aggregates is disposed in an oblique direction against the arrangement direction of the unit batteries.

The battery aggregates may be disposed spaced apart.

The battery aggregates may be formed in a pair to be disposed symmetrically to each other.

The housing includes an inlet portion for supplying cooling medium for temperature control to the space between the battery aggregates, and an outlet portion for discharging the cooling medium passed through the battery aggregates.

The battery aggregate has a cell barrier disposed between the unit batteries, and the cell barrier may include at least one passage passing the cooling medium therethrough.

The passage may be formed with a channel communicating with the outlet portion and the space between the battery aggregates.

The housing may have a structure that the flow direction of the cooling medium moving to the space between the battery aggregates through the inlet portion is substantially the same as the flow direction of the cooling medium discharging through the outlet portion.

An inlet hole may be formed at one side of the housing and an outlet hole may be formed at the other side of the housing facing the inlet hole.

The housing may have a structure that the flow direction of the cooling medium moving to the space between the battery aggregates through the inlet portion is substantially opposite to the flow direction of the cooling medium discharging through the outlet portion.

An inlet hole may be formed at one side of the housing and an outlet hole may be formed adjacent to the inlet hole.

According to another aspect of the present invention, a secondary battery module comprises at least more than two battery aggregates having a plurality of unit batteries continuously arranged, the battery aggregates being disposed symmetrically spaced apart from each other, and a housing receiving the battery aggregates and circulating cooling medium for temperature control between the unit batteries through the space between the battery aggregates, wherein, with respect to the arrangement direction of the unit batteries, each of the unit batteries of each of the battery aggregates is disposed in an oblique direction against the arrangement direction, and each of the battery aggregates includes a supporting unit closely contacting the unit batteries to each other to integrally support them.

The housing includes a mounting portion receiving the battery aggregates, an inlet portion for supplying the cooling medium to the space between the battery aggregates, and an outlet portion for discharging the cooling medium passed through the battery aggregates.

The supporting unit includes end plates closely contacted with the outermost unit batteries, respectively, a connecting rod to be connected to the end plates, and at least one supporting bar disposed to connect the end plates, and arranged along the arrangement direction of the unit batteries to support the unit batteries.

The supporting unit further includes a fastening portion having a fastening hole fastening the connecting rod, the fastening portion being protruded at the end plate.

The supporting unit includes end plates closely contacted with the outermost unit batteries, respectively, a connecting rod connecting the end plates, and a fastening portion having a fastening hole fastening the connecting rod, the fastening portion being protruded at the end plate and being perpendicular to the arrangement direction of the unit batteries to be at a right angle to the connecting rod.

The fastening portion may be protruded at both side ends of the end plates facing each other, and it may be bent at a predetermined angle to the end plate.

The thickness of the end plate may be equal to or less than the thickness of the fastening portion.

A connecting portion disposed between the end plate and the fastening portion may have an arc cross-section.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings. The embodiments are described below to explain the present invention by referring to the figures.

Figure 1:
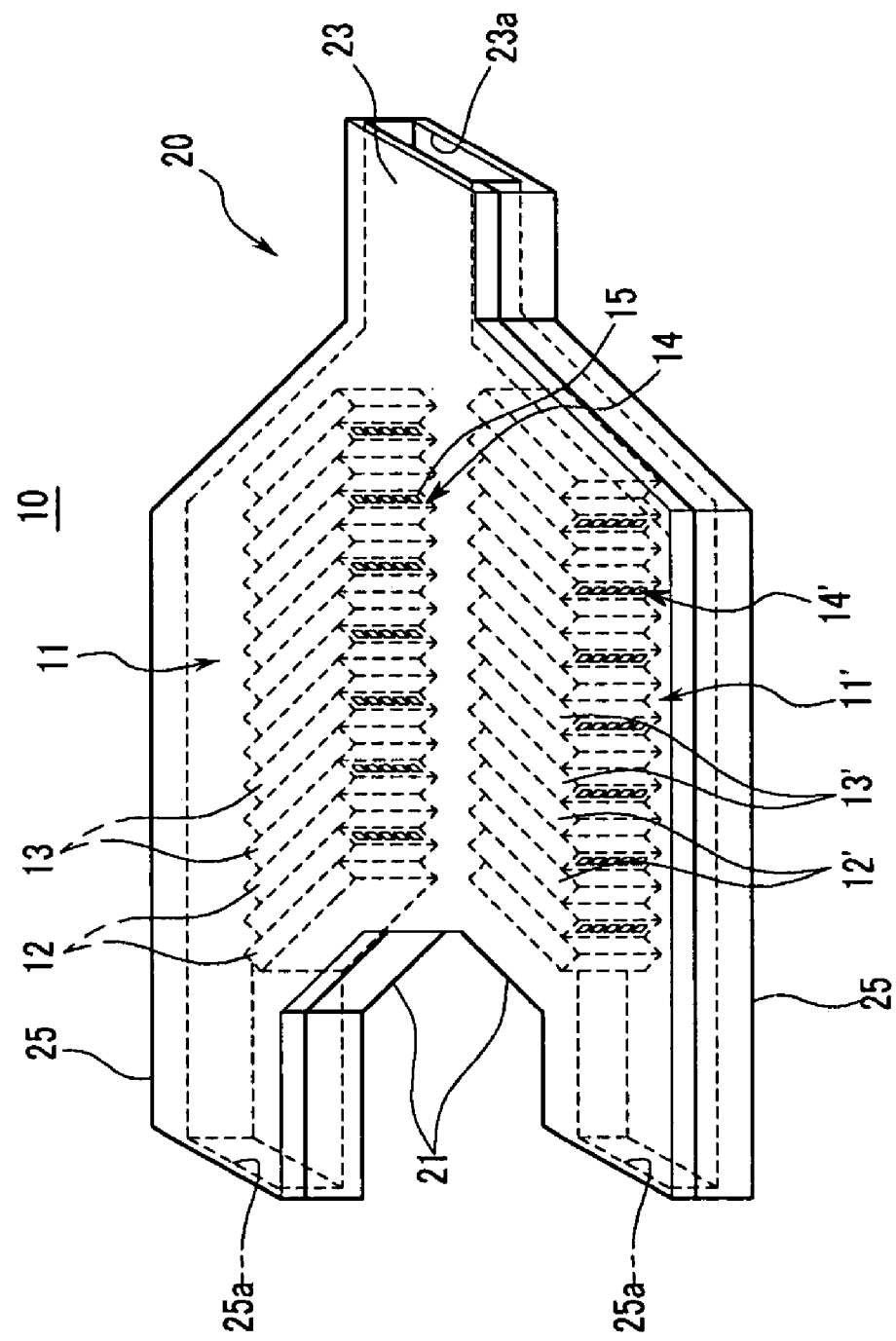
FIG. 1 is a schematic perspective view of a secondary battery module according to the first embodiment of the present invention.
Figure 2:
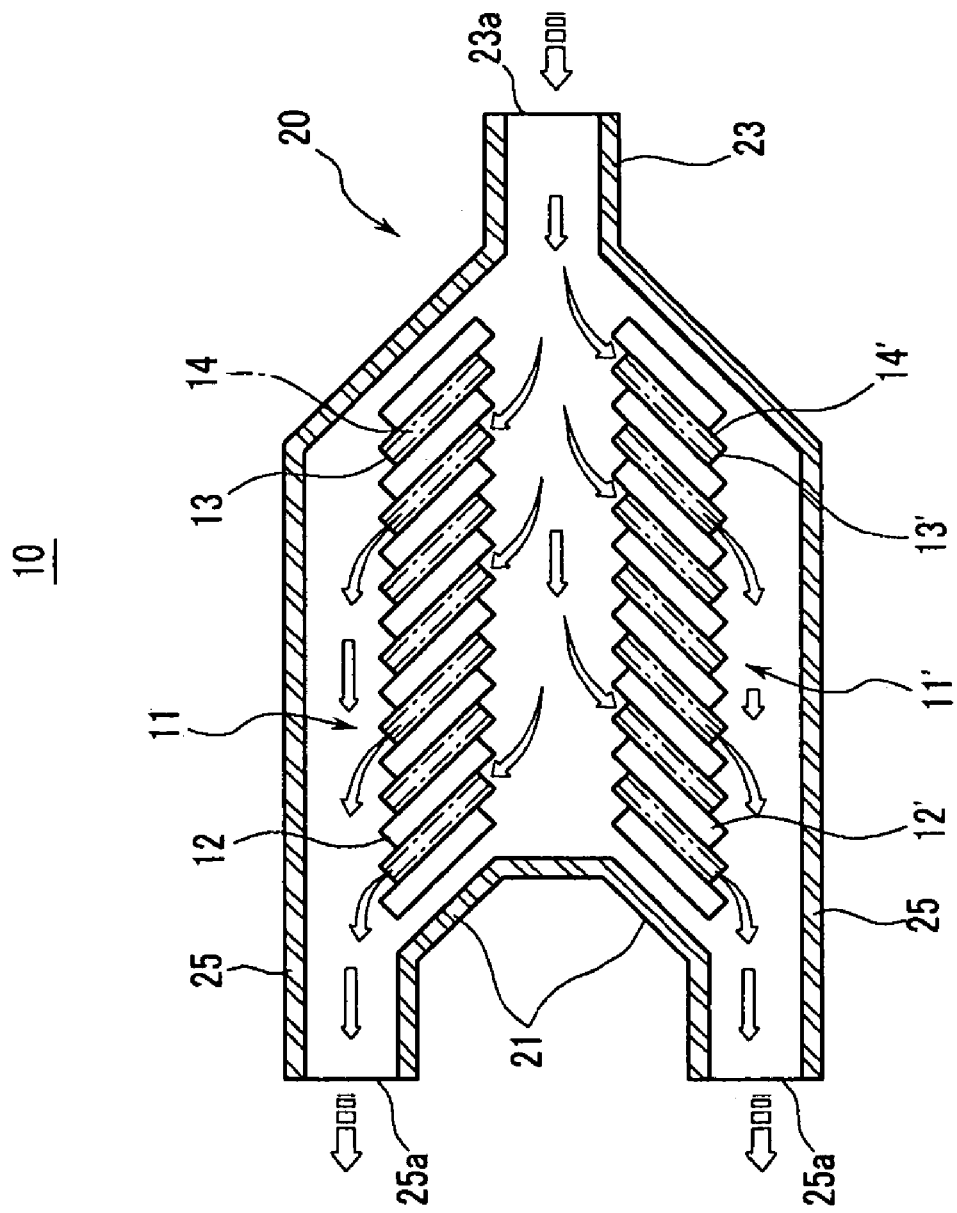
FIG. 2 is a cross-sectional plan view of FIG. 1.

FIG. 1 is a schematic perspective view of a secondary battery module according to the first embodiment of the present invention, and FIG. 2 is a cross-sectional plan view of FIG. 1.

With reference to these drawings, the secondary battery module 10 comprises a battery aggregate 11 having a plurality of unit batteries 12 continuously arranged spaced apart at a predetermined distance, and a housing 20 receiving the battery aggregate 11. Cooling medium for controlling temperature of the unit battery 12 is circulated inside the housing 20, and cooling air, cooling water, other cooling fluid, etc may be used as the cooling medium.

In the present embodiment, air (hereinafter "cooling air") which can be easily obtained from nature by a blowing apparatus such as a fan or a blower is used as the cooling medium.

Each unit battery 12 includes an electrode assembly having a positive electrode, a negative electrode, and a separator; and a container receiving the electrode assembly. In the present embodiment, it is a prismatic type.

The battery aggregate 11 has an aggregate structure that has a plurality of the unit batteries 12 and continuously arranges them spaced apart at a predetermined distance to thereby form one row.

In the battery aggregate 11, a cell barrier 13 is disposed between each of the unit batteries 12. The cell barrier 13 maintains the distance between each of the unit batteries 12 constant, and circulates the cooling air between each of the unit batteries 12, and it also has a function to support the side surface of each unit battery 12.

In order to circulate the cooling air, a plurality of passages 14 are formed in the cell barrier, and the passage 14 may have a shape of a tunnel 15 passing through the inside of the cell barrier along the long side direction of the unit battery 12, i.e., the width direction of the barrier aggregate 11.

At least two battery aggregates 11 may be mounted within the housing 20, and in the present embodiment, a pair of them are mounted in the housing 20, as shown in the drawing.

Then, the battery aggregates 11 and 11' are disposed in the same plane spaced apart from each other at a predetermined distance. That is, each of the battery aggregates 11 and 11' has its own cell barriers 13 and 13' and passages 14 and 14' facing the center of the housing 20, and they are spaced apart at a predetermined distance to keep them parallel to each other.

Such an arrangement of the battery aggregates 11 and 11' allows the entire height of the secondary battery module 10 not to increase, which can be effective in minimizing the size of the secondary battery module 10.

More specifically, the battery aggregates 11 and 11' are symmetrically arranged with respect to an imaginary center line disposed in the space between them so that their entire configuration has a fishbone shape.

That is, each of the battery aggregates 11 and 11' has a structure such that their own unit batteries 12 and 12' are inclined toward the center of the housing at a predetermined angle.

In addition, the cell barriers 13 and 13' are arranged to be inclined corresponding to the unit batteries 12 and 12' as they are closely contacted with the unit batteries 12 and 12'.

The degree of inclination of the unit batteries 12 and 12' and the cell barriers 13 and 13' is decided considering that the cooling air flowed into the housing 20 can be smoothly passed through the passages 14 and 14' of the cell barriers 13 and 13', but it is not limited to any specific value.

In the meantime, the unit batteries 12 and 12' of the battery aggregates 11 and 11' can be fixed by a supporting unit to form an integral body.

Figure 3:
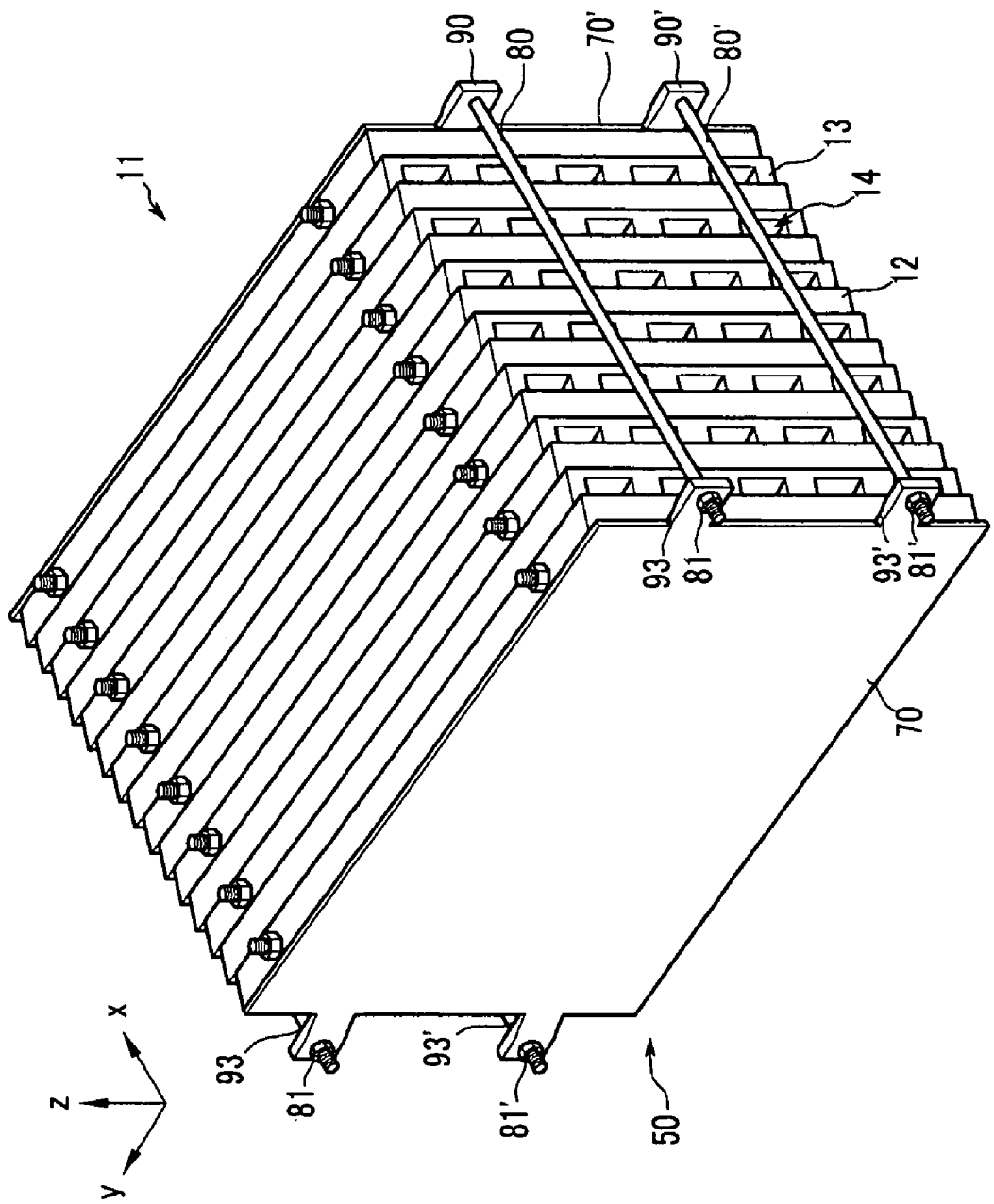
FIG. 3 is a perspective view of a battery aggregate of the secondary battery module according to the first embodiment of the present invention.
Figure 4:
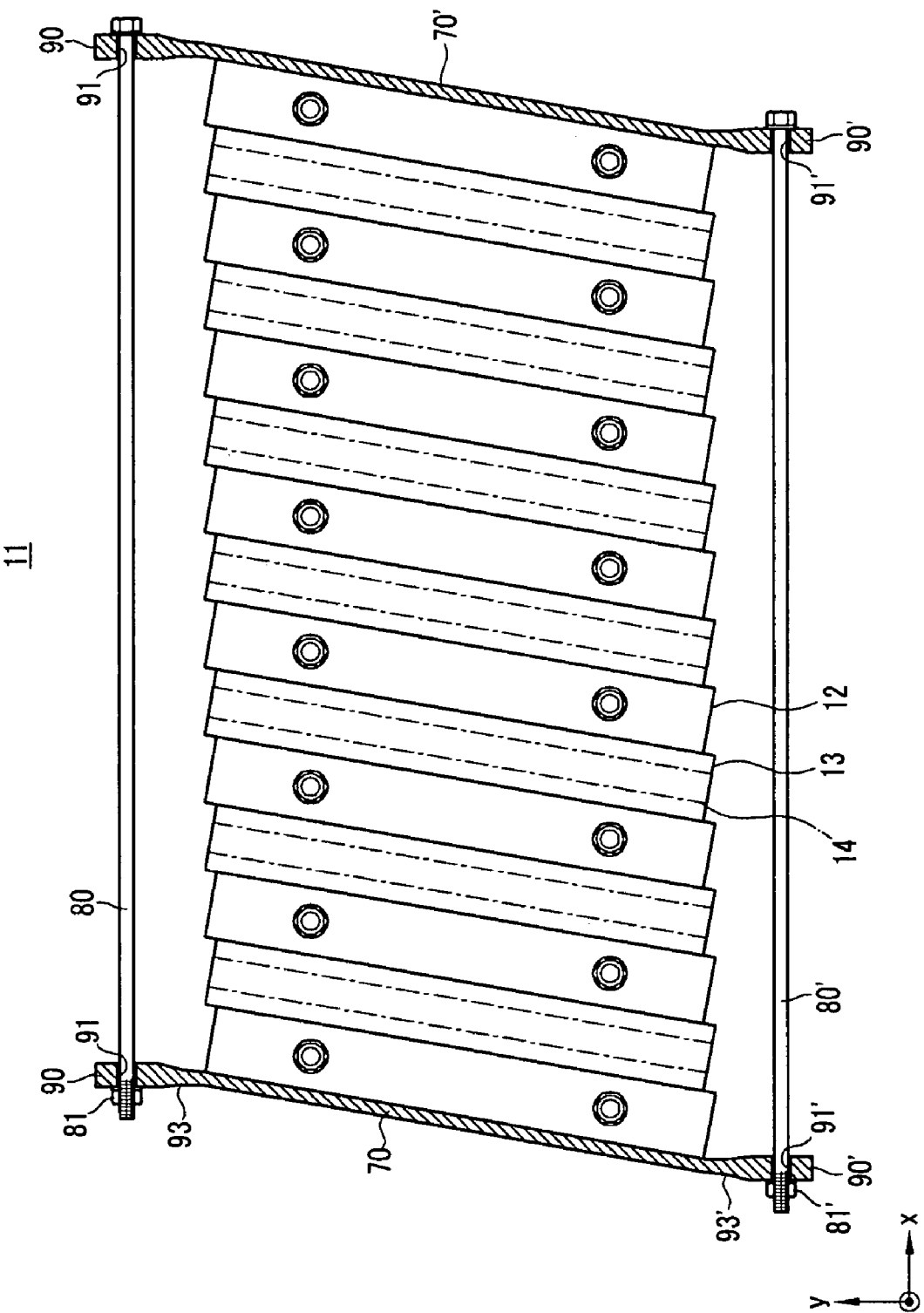
FIG. 4 is a partial cross-sectional plan view of FIG. 3.

With reference to FIGS. 3 and 4, the supporting unit 50 includes end plates 70 and 70' closely contacted with the unit batteries 12 disposed at the outermost two sides of the unit batteries 12, respectively, and connecting rods 80 and 80' connecting a pair of the end plates 70 and 70' to be fixed to the end plates 70 and 70'.

FIGS. 3 and 4 shows only one battery aggregate 11 since a pair of the battery aggregates 11 and 11' are formed symmetrically to each other as described above.

More specifically, the end plates 70 and 70' of the supporting unit 50 are closely contacted with the side surface of the unit battery 12.

The connecting rods 80 and 80' have a bolt like shape with a bolt head at their one end and a screw thread at the other end. These connecting rods 80 and 80' are disposed along the arrangement direction of the unit batteries 12 (the X direction of the drawing), and are fastened to the end plates 70 and 70' by nuts 81 and 81'.

For this, the end plates 70 and 70' may have fastening portions 90 and 90' to receive and fasten the connecting rods 80 and 80'. In the present embodiment, these fastening portions 90 and 90' may have an integrally protruding form at the short side of the end plates 70 and 70', and they have fastening holes 91 and 91' inside which the connecting rods 80 and 80' are inserted.

In the present embodiment, the fastening portions 90 and 90' are formed in a pair at both ends of the end plates 70 and 70', respectively, and are protruded to the perpendicular direction (the Y direction of the drawing) with respect to the arrangement direction (X) of the unit batteries 12. That is, as shown in FIG. 4, the fastening portions 90 and 90' are bent from the end plates 70 and 70' at the same angle as the angle by which the end plates 70 and 70' are inclined with respect to the perpendicular direction, and they are disposed perpendicular to the arrangement direction (X) of the unit batteries 12.

Accordingly, the fastening portions 90 and 90' and the connecting rods 80 and 80' passing through the fastening holes 91 and 91' of the fastening portions 90 and 90' to be fixed to these fastening portions 90 and 90' meet each other at a right angle, and therefore, even if the unit batteries 12 and the end plates 70 and 70' are inclined, they can enhance fixing strength to the connecting rods 80 and 80' to be allowed to maintain stable fixing state.

Figure 5:
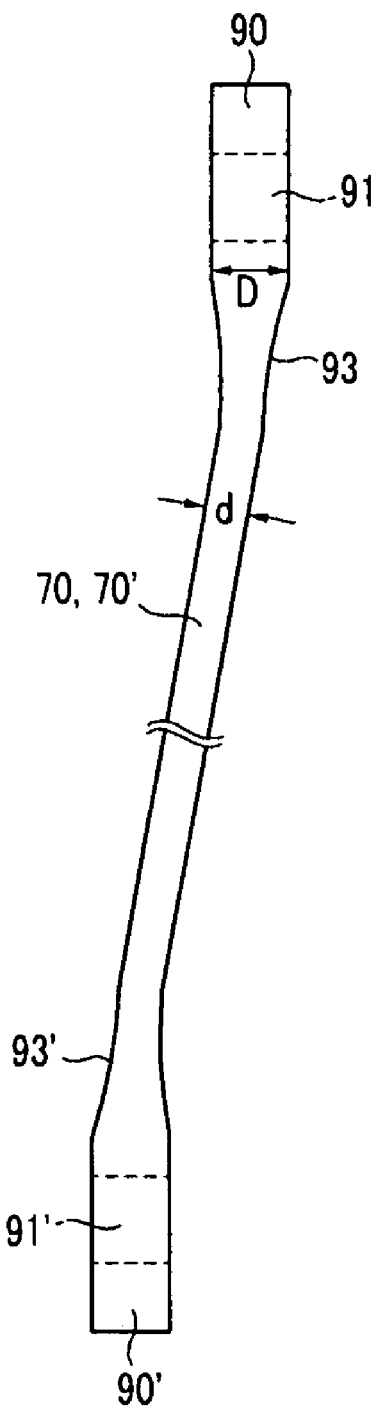
FIG. 5 is a side view of an end plate of the secondary battery module according to the first embodiment of the present invention.

According to the present embodiment, the end plates 70 and 70' and the fastening portions 90 and 90' have a structure such that the thickness (D) of the fastening portions 90 and 90' is equal to or greater than the thickness (d) of the end plates 70 and 70', as shown in FIG. 5.

This is because if the connecting rods 80 and 80' are fastened to the fastening holes 91 and 91' of the fastening portions 90 and 90', the connecting rods 80 and 80' cause the stress in the fastening portions 90 and 90'. Therefore, to make the thickness (D) of the fastening portions 90 and 90' equal to or greater than the thickness (d) of the end plates 70 and 70' ensures the structural strength against the stress. Furthermore, to make the thickness (d) of the end plates 70 and 70' less than the thickness (D) of the fastening portions 90 and 90' minimizes the weight of the battery aggregates 11 and 11'.

Accordingly, the secondary battery module 10 according to the present embodiment can provide the battery aggregates 11 and 11' which increase the fixing strength between the unit batteries 12 and 12' and achieve lightweighting.

In addition, connecting portions 93 and 93' formed between the end plates 70 and 70' and the fastening portions 90 and 90' have a cross-section of an arc concave to the inside of the end plates 70 and 70'.

Such connecting portions 93 and 93' are disposed between the end plates 70 and 70' and the fastening portions 90 and 90' having the thickness difference to smoothly connect the end plates 70 and 70' and the fastening portions 90 and 90', which distributes the stress generated between the end plates 70 and 70' and the fastening portions 90 and 90' to prevent the concentration of the stress from breaking the connection region of the end plates 70 and 70' and the fastening portions 90 and 90'.

In such secondary battery module 10, the housing 20 has the function of not only receiving the battery aggregates 11 and 11' but also circulating cooling air through the passages 14 and 14' of each of the cell barriers 13 and 13' of the battery aggregates 11 and 11'.

According to the embodiment of the present invention, the housing 20 may have a case shape including the following elements.

This housing 20 includes a mounting portion 21 having an inner space to mount the battery aggregates 11 and 11'. The mounting portion 21 has an inlet portion 23 for supplying cooling air to the inner space at its one side, and an outlet portion 25 for discharging the cooling air passed through the passage 14 of each of the cell barriers 13 and 13' at the other side.

As described above, the mounting portion 21 receives a pair of the battery aggregates 11 and 11' to fix the battery aggregates 11 and 11' in its inner space. To fix such battery aggregates 11 and 11', various part components such as a bracket, block, cover, collar, etc., which are not shown in the drawing, may be disposed to connect the mounting portion 21 and the battery aggregates 11 and 11'.

This mounting portion 21 may be comprised of more than two parts and are separably fixed to receive the battery aggregates 11 and 11'.

The inlet portion 23 is for injecting cooling air into the spaced space between the battery aggregates 11 and 11', and it has an inlet hole 23a communicating with the spaced space. Considering that a pair of the battery aggregates 11 and 11' are spaced apart in the mounting portion 21, the inlet hole 23a may have a pattern such that a single hole is formed at one side of the mounting portion 21.

The outlet portion 25 is for discharging the cooling air passed through the passages 14 and 14' of the cell barriers 13 and 13' from the spaced space between the battery aggregates 12 and 12'.

The outlet portion 25 has an outlet hole 25a communicating with the inner space of the mounting portion 21 and the outside of the mounting portion 21. In the present embodiment, the outlet portion 25 may be disposed at both ends of the mounting portion 21 to dispose the inlet portion 23 at the center of the mounting portion 21 (FIGS. 1 and 2).

According to such structures of the inlet portion 23 and the outlet portion 25, the flow path of cooling air moving through the inside of the mounting portion 21 may have a branched pattern that divides it into two directions from one point (the center of the spaced space of the battery aggregates).

The assembly process of the secondary battery module 10 according to the first embodiment of the present invention with the above structure is that a plurality of the unit batteries 12 and 12' and the cell barriers 13 and 13' disposed between these unit batteries 12 and 12' are aligned in a line and the end plates 70 and 70' are disposed at the outermost unit batteries 12 and 12'.

Then, the connecting rods 80 and 80' are inserted and fixed to the fastening holes 91 and 91' of the fastening portions 90 and 90', and the nuts 81 and 81' are fastened to the front ends of the connecting rods 80 and 80' protruded through the fastening holes 91 and 91', which forms the battery aggregates 11 and 11' of an inclined shape such that a plurality of the unit batteries 12 and 12' and the cell barriers 13 and 13' are oblique against their arrangement direction (X).

That is, during the assembly process, the fastening portions 90 and 90' are inclined to the end plates 70 and 70' by a predetermined angle (the drawing shows that the fastening portions are perpendicular to the end plates), and therefore, the connecting rods 80 and 80' passes through perpendicularly to the fastening portions 90 and 90' to be fastened at a right angle to each other.

Accordingly, the end plates 70 and 70' naturally maintain the inclined state, and the unit batteries 12 and 12' and the cell barriers 13 and 13' disposed between the end plates 70 and 70' can also be assembled while inclined corresponding to the inclined state of the end plates 70 and 70'.

In the meantime, during the assembly process, the fastening portions 90 and 90' are tightened toward the inside of the battery aggregates 11 and 11' by the connecting rods 80 and 80', which may cause the stress at the connecting portions 93 and 93' between the end plates 70 and 70' and the fastening portions 90 and 90'.

However, this stress is uniformly distributed over the entire region of the connecting portions 93 and 93' having an arc cross-section so that it is not concentrated on any one spot.

After completing the assembly of the battery aggregates 11 and 11', as a pair of the battery aggregates 11 and 11', these battery aggregates 11 and 11' are mounted inside the mounting portion 21 of the housing 20 while spaced apart from each other, and thereby the secondary battery module 10 according to the present embodiment is formed.

When such secondary battery module 10 works, the cooling air is flowed into the inner space of the housing 20, i.e., the spaced space between the battery aggregates 11 and 11', through the inlet portion 23.

During this process, as the unit batteries 12 and 12' and the cell barriers 13 and 13' of the battery aggregates 11 and 11' are disposed to be inclined along their oblique direction against the arrangement direction (X), the cooling air moves along the arrangement direction (X) in the spaced space between the battery aggregates 11 and 11' to uniformly invade the passages 14 and 14' of the cell barriers 13 and 13'.

That is, as the cooling air flowed into the spaced space between the battery aggregates 11 and 11' floats in the spaced space, it partially flows into the passages 14 and 14' of the cell barriers 13 and 13'.

As such cooling air passes through the passages 14 and 14', it cools the heat generated from each of the unit batteries 12 and 12', and then flows outside the housing 20 through the outlet portion 25.

Then, as the cooling air moves along the substantially same direction as the flow direction moving to the spaced space between the battery aggregates 11, it flows out through the outlet hole 25*a* (the arrow direction of FIG. 2).

The secondary battery module 10 according to the embodiment of the present invention disposes a plurality of the battery aggregates 11 parallelly inside the housing 20 to minimize the height of the module, which prevents increasing the size of the module and also allows the cooling air to be smoothly circulated to the passage 14 of the cell barrier 13.

Accordingly, the secondary battery module 10 of the present embodiment partially cools the unit battery over its entire region to prevent the heat imbalance of the battery aggregates, which can maximize the cooling efficiency for the unit battery.

Figure 6:
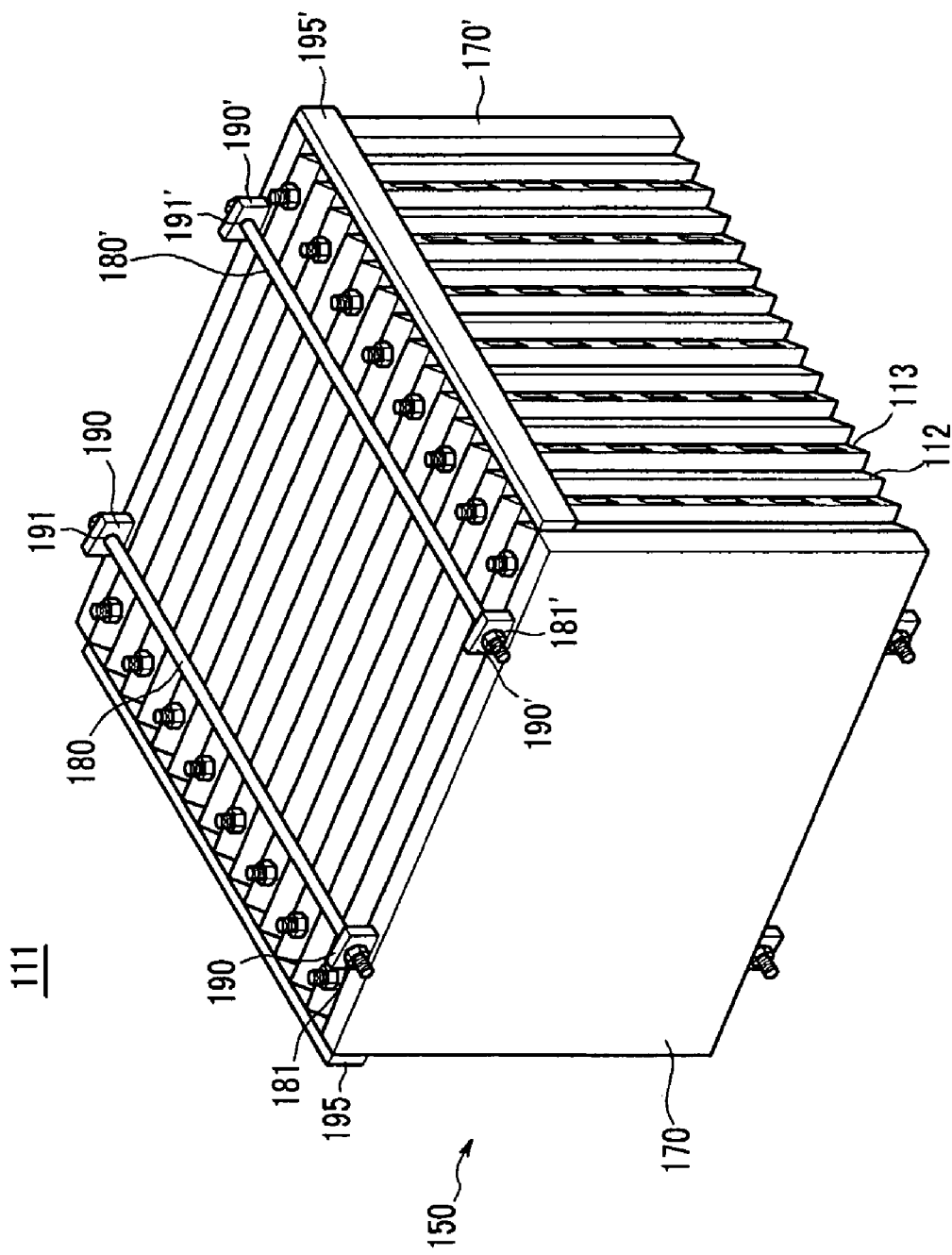
FIG. 6 is a perspective view of a battery aggregate of a secondary battery module according to the second embodiment of the present invention.
Figure 7:
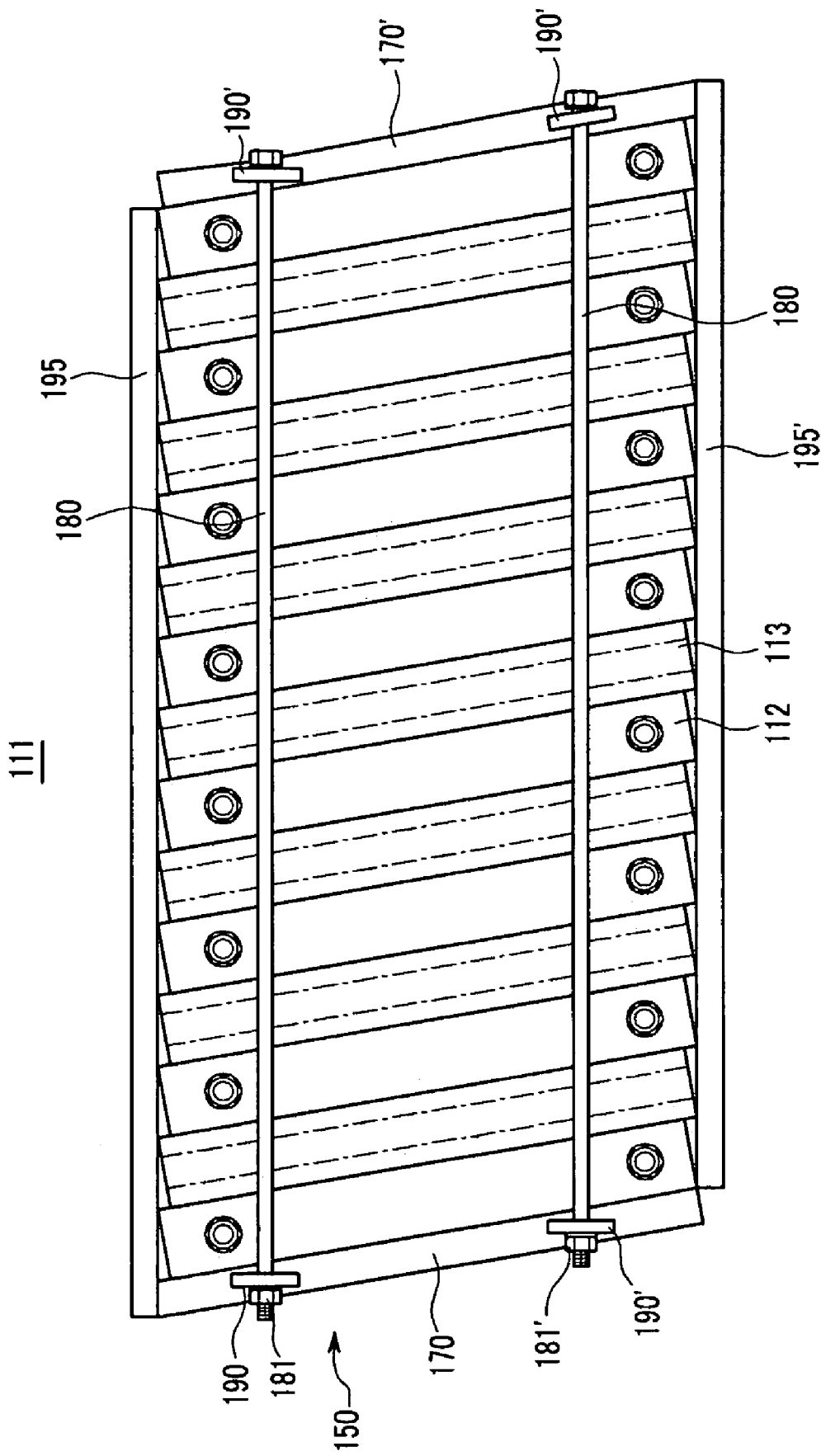
FIG. 7 is a plan view of FIG. 6.

FIG. 6 is a perspective view of a battery aggregate of a secondary battery module according to the second embodiment of the present invention, and FIG. 7 is a plan view of FIG. 6.

With reference to the drawings, the battery aggregate 111 of the secondary battery module according to the second embodiment has a supporting unit 150 closely contacting the unit batteries 112 and integrally supporting them. The supporting unit 150 includes end plates 170 and 170' closely contacted with the unit batteries 112 disposed at the outermost sides, respectively, connecting rods 180 and 180' connecting a pair of the end plates 170 and 170', fastening portions 190 and 190' to fasten the end plates 170 and 170' and the connecting rods 180 and 180', and supporting bars 195 and 195' supporting the unit batteries 112.

The end plates 170 and 170' have a size corresponding to the unit battery 112, and are inclined corresponding to the inclined angle of the unit batteries 112 to be closely contacted with the unit batteries 112 disposed at the outermost sides of the battery aggregates 111, respectively.

The connecting rods 180 and 180' have a bolt like shape with a bolt head at their one end and a screw thread at the other end. These connecting rods 180 and 180' are disposed along the arrangement direction of the unit batteries 112, and are fastened to the end plates 170 through nuts 181 and 181'.

The fastening portions 190 and 190' are integrally protruded at both ends of each of the end plates 170 and 170', i.e., the long sides of the end plates 170 and 170' in the drawing.

In details, the fastening portions 190 and 190' have fastening holes 191 and 191' fastening the connecting rods 180, and are disposed in the perpendicular direction with respect to the arrangement direction of the unit batteries 112, and are protruded from both ends to the outside of the long side of the end plates 170 and 170'.

The supporting bars 195 and 195' are disposed parallelly to the connecting rods 180 and 180' along the arrangement direction of the unit batteries 112, and have a fixed end connecting their one end to each of the end plates 170 and 170'.

Then, the supporting bars 195 and 195' are connected to the edge of the corner of the end plates 170 and 170' by welding. The supporting bars 195 and 195' of the present second embodiment are fixed to the short side of the upper portion of the end plates 170 and 170' to support the short side of the unit battery 112 and the cell barrier 113, and the other end is a free end.

As described above, in the second embodiment, the supporting bars 195 and 195' are disposed along the arrangement direction of the unit batteries 112 at a predetermined angle with respect to each of the end plates 170 and 170' to support the short side of the unit batteries 112. Accordingly, the end plates 170 and 170' naturally maintain the inclined state, and the unit battery 112 and the cell barrier 113 disposed between the end plates 170 and 170' can maintain the inclined state stably while supported by the end plates 170 and 170' and the supporting bars 195 and 195'.

Figure 8:
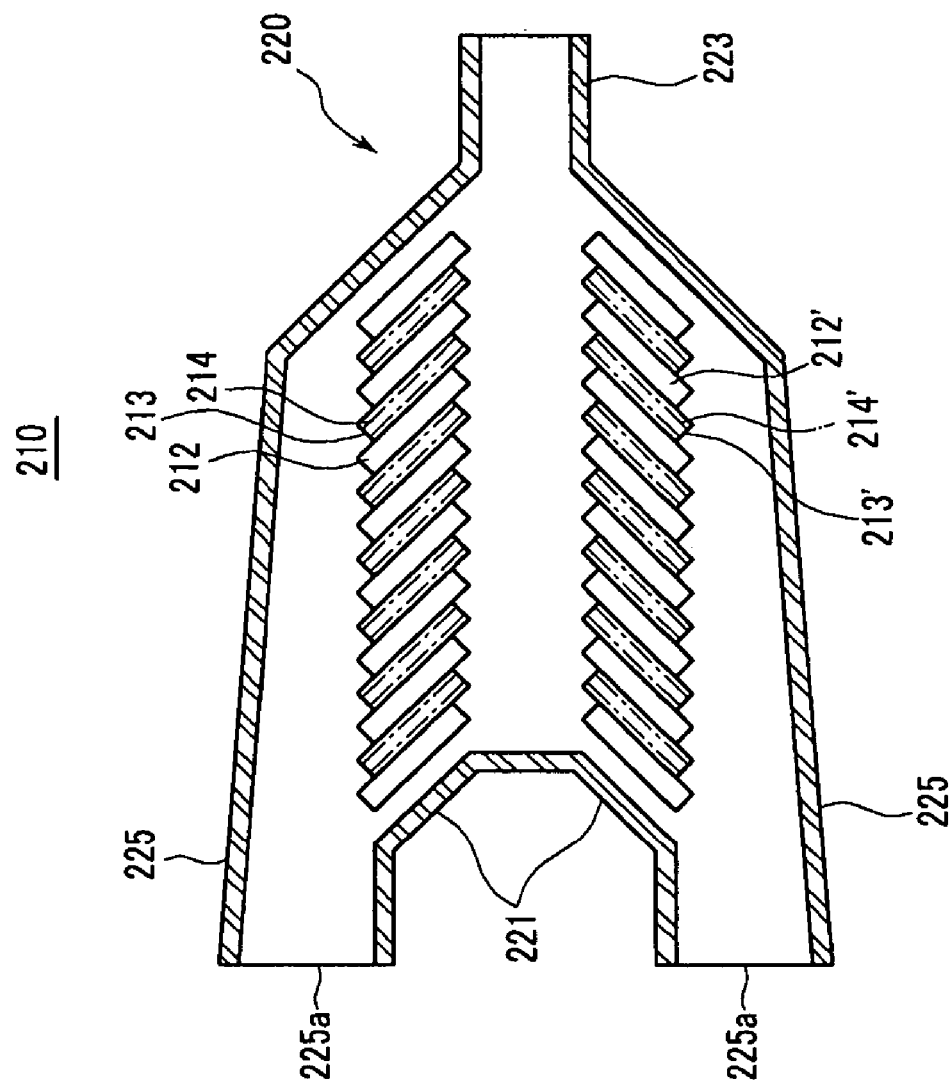
FIG. 8 is a schematic cross-sectional plan view of a secondary battery module according to the third embodiment of the present invention.

FIG. 8 is a schematic cross-sectional plan view of a secondary battery module according to the third embodiment of the present invention.

With reference to the drawing, the secondary battery module 210 according to the present third embodiment basically has a similar overall structure as that of the first embodiment described above, but an outlet portion 225 has a shape such that the cross-section of an outlet hole 225*a* is gradually wider as it is farther away from an inlet portion 223.

Such a shape of the outlet portion 225 can be achieved by disposing an outer wall of the outlet portion 225 and an outer wall of a mounting portion 221 of a housing 220 to be inclined to an imaginary center line positioned along the arrangement direction of unit batteries 212 and 212'.

As the secondary battery module 210 according to the third embodiment has the outlet portion 225 inclined at a predetermined angle not parallel to the arrangement direction of the unit batteries 212, cooling air can be more smoothly discharged when the cooling air is passed through passages 214 and 214' of cell barriers 213 and 213' disposed between unit batteries 212 and discharged outside the housing 220 through the outlet portion 225.

Figure 9:
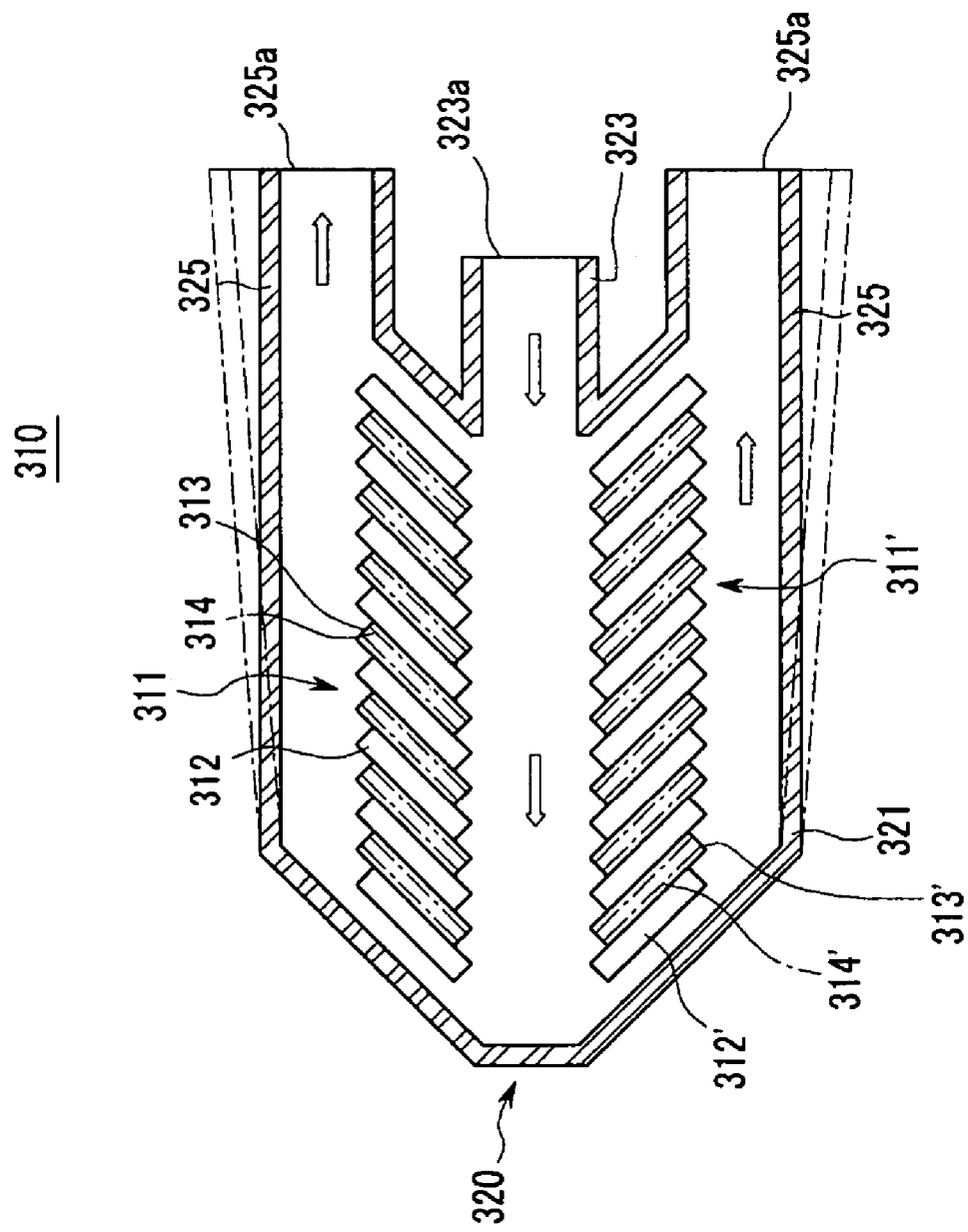
FIG. 9 is a schematic cross-sectional plan view of a secondary battery module according to the fourth embodiment of the present invention.

FIG. 9 is a schematic cross-sectional plan view of a secondary battery module according to the fourth embodiment of the present invention.

With reference to the drawing, the secondary battery module 310 according to the fourth embodiment has a housing 320 with a structure such that the flow direction of cooling air moving to the spaced space between battery aggregates 311 and 311' is opposite to the flow direction of the cooling air discharged through the space between each of unit batteries 312 and 312' of the battery aggregates 311 and 311'.

This housing 320 includes a mounting portion 321 receiving the battery aggregates 311 and 311', an inlet portion 323 communicating with the spaced space between the battery aggregates 311 and 311', and an outlet portion 325 communicating with the space between the battery aggregates 311 and 311' and the mounting portion 321.

Then, the outlet portion 325 can be disposed to be parallel to the arrangement direction of the unit batteries 312, or as the imaginary line shown in the drawing, it can be disposed to be inclined to an imaginary center line disposed with respect the arrangement direction of the unit batteries 312 and 312'.

The inlet portion 323 may have a single inlet hole 323a disposed at its one side surface, and the outlet portion 325 may have an outlet hole 325a adjacent to the inlet hole 323a to be disposed at its both sides with respect to the inlet hole 323a.

The battery aggregates 311 and 311' of the fourth embodiment may be formed to be inclined by vertically arranging the unit batteries 312 and 312' inside the mounting portion 321, fixing their one side facing the center of the mounting portion 321, and distorting them toward one direction (the right hand side of the drawing).

In such secondary battery module 310, the cooling air flowed into the spaced space between the battery aggregates 311 and 311' through the inlet hole 323a cools the heat generated from each of the unit batteries 312 and 312' by passing through passages 314 and 314' of cell barriers 313 and 313' of the battery aggregates 311 and 311'.

Then, the heat exchanged cooling air moves to the opposite direction to the flow direction moving to the spaced space between the battery aggregates 311 and 311' to be discharged outside the housing 320 through the outlet hole 325a of the outlet portion 325 (the arrow of FIG. 9).

As described above, the embodiments of the present invention improve the arrangement structure of the unit batteries disposed inside the housing so that they can minimize the volume of the secondary battery module, and also prevent the heat imbalance caused by partially cooling the unit batteries in the battery aggregates.

Therefore, the present invention can maximize the cooling efficiency for the unit batteries, and accordingly, the charge and discharge efficiency of the unit batteries can be further enhanced.

The secondary battery module according to the present invention can be used as the power source for motor driving devices requiring high power characteristics, such as the hybrid electric vehicles, electric vehicles, wireless vacuum cleaners, motorbikes, or motor scooters.

Figure 10:
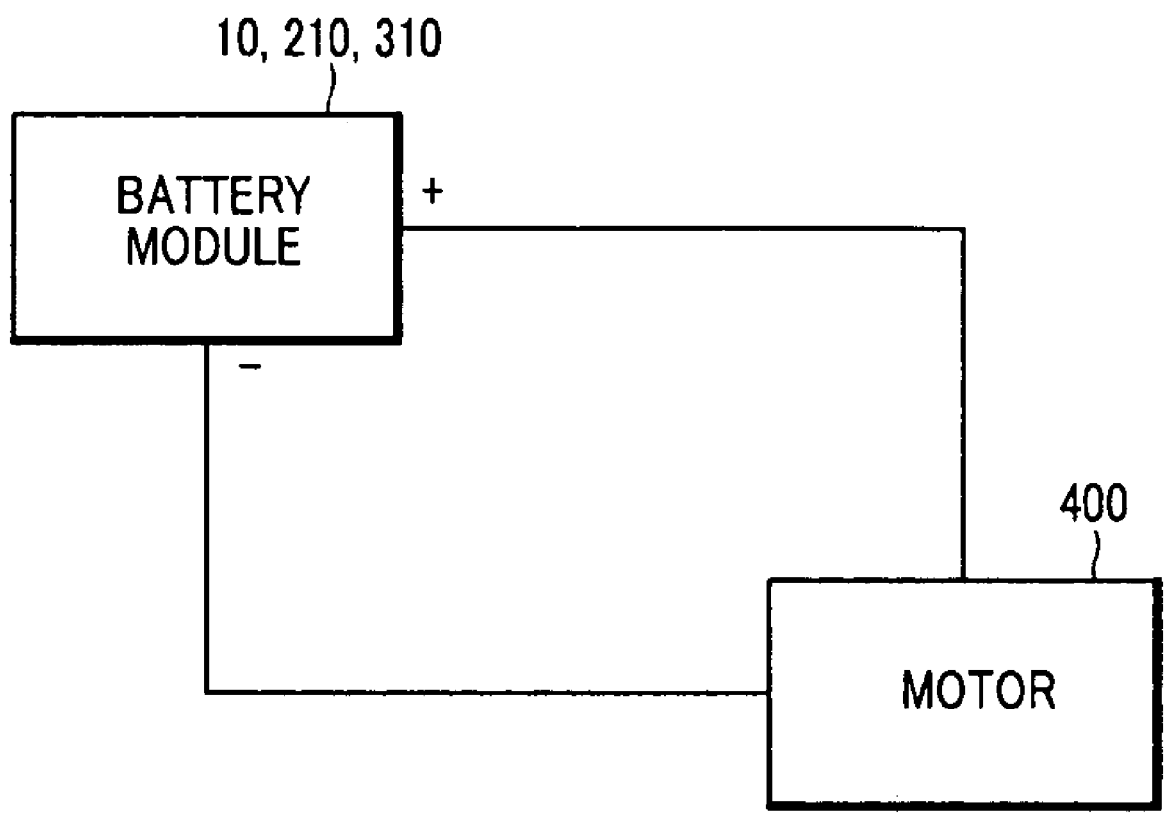
FIG. 10 is a block diagram schematically illustrating motor drive by the secondary battery module according to the embodiment of the present invention.

FIG. 10 is a block diagram schematically illustrating driving a motor 400 by the secondary battery modules 10, 210, and 310 shown in FIG. 1, FIG. 8 and FIG. 9.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery module comprising:
at least two battery aggregates each having a plurality of unit batteries and a plurality of cell barriers, each of the cell barriers between two adjacent ones of the unit batteries; and
a housing receiving the battery aggregates, wherein the housing includes an inlet portion having a wall around an axis that is substantially parallel to an arrangement direction of the unit batteries, the inlet portion for supplying cooling medium to a space between the battery aggregates, and at least two outlet portions for discharging the cooling medium passed through the battery aggregates,
wherein each of the unit batteries of each of the battery aggregates is oriented in an oblique direction against the arrangement direction of the unit batteries.

2. The secondary battery module of claim 1, wherein the battery aggregates are spaced apart.

3. The secondary battery module of claim 2, wherein the battery aggregates are arranged in a pair symmetrically to each other.

4. The secondary battery module of claim 1, wherein each of the cell barriers includes at least one passage for passing the cooling medium therethrough.

5. The secondary battery module of claim 4, wherein the at least one passage comprises a channel communicating with the at least two outlet portions and the space between the battery aggregates.

6. The secondary battery module of claim 1, wherein the housing has a structure such that a flow direction of the cooling medium moving to the space between the battery aggregates through the inlet portion is substantially the same as a flow direction of the cooling medium discharging through the at least two outlet portions.

7. The secondary battery module of claim 6, wherein an inlet hole is at one side of the housing and an outlet hole is at a side of the housing other than the one side facing the inlet hole.

8. The secondary battery module of claim 1, wherein the housing has a structure such that a flow direction of the cooling medium moving to the space between the battery aggregates through the inlet portion is substantially opposite to a flow direction of the cooling medium discharging through the at least two outlet portions.

9. The secondary battery module of claim 8, wherein an inlet hole is at one side of the housing and an outlet hole is adjacent to the inlet hole.

10. A secondary battery module comprising:
at least two battery aggregates having a plurality of unit batteries and a plurality of cell barriers, each of the cell barriers between two adjacent ones of the unit batteries, the battery aggregates symmetrically spaced apart from each other; and
a housing for receiving the battery aggregates and circulating cooling medium for temperature control between the unit batteries through spaces between the battery aggregates, wherein the housing includes an inlet portion having a wall around an axis that is substantially parallel to an arrangement direction of the unit batteries, the inlet portion for supplying the cooling medium to a space between the battery aggregates, and at least two outlet portions for discharging the cooling medium passed through the battery aggregates, wherein each of the unit batteries of each of the battery aggregates is oriented in an oblique direction against the arrangement direction of the unit batteries, and each of the battery aggregates includes a supporting unit to support the unit batteries in the arrangement direction thereof.

11. The secondary battery module of claim 10, wherein the cell barrier includes at least one passage for passing the cooling medium therethrough.

12. The secondary battery module of claim 10, wherein the housing further includes a mounting portion for receiving the battery aggregates.

13. The secondary battery module of claim 10, wherein the at least two outlet portions each have a wall around a respective axis that is substantially parallel to the arrangement direction of the unit batteries.

14. The secondary battery module of claim 10, wherein the at least two outlet portions each have a wall that is inclined with respect to the arrangement direction of the unit batteries.

15. The secondary battery module of claim 10, wherein the supporting unit includes:
end plates contacting outermost unit batteries of the plurality of unit batteries, respectively;
a connecting rod to be connected to the end plates; and
at least one supporting bar connecting the end plates to support the unit batteries along the arrangement direction thereof.

16. The secondary battery module of claim 15, wherein the supporting unit further includes a fastening portion having a fastening hole fastening the connecting rod, the fastening portion being protruded at each of the end plates.

17. The secondary battery module of claim 10, wherein the supporting unit includes:
end plates contacting outermost unit batteries, respectively;
a connecting rod connecting the end plates; and
a fastening portion having a fastening hole fastening the connecting rod, the fastening portion protruding at the end plates and perpendicular to the arrangement direction of the unit batteries such that the fastening portion is at a right angle to the connecting rod.

18. The secondary battery module of claim 17, wherein the fastening portion protrudes at sides of the end plates facing each other, and is oriented at an angle to the end plate.

19. The secondary battery module of claim 17, wherein a thickness of the end plate is equal to or less than a thickness of the fastening portion.

20. The secondary battery module of claim 17, wherein a connecting portion between the end plate and the fastening portion has an arc cross-section.

21. The secondary battery module of claim 10, wherein the unit batteries are prismatic shape batteries.

22. The secondary battery module of claim 10, wherein the secondary battery module is configured to be used for a motor driven device.

23. A secondary battery module comprising:
at least two battery aggregates each having a plurality of unit batteries continuously arranged; and
a housing receiving the battery aggregates, wherein the housing includes a mounting portion receiving the battery aggregates, an inlet portion having a wall around an axis that is substantially parallel to an arrangement direction of the unit batteries, the inlet portion for supplying cooling medium to a space between the battery aggregates, and at least two outlet portions for discharging the cooling medium passed through the battery aggregates;
wherein, each of the unit batteries of each of the battery aggregates is disposed in an oblique direction with respect to the arrangement direction of the unit batteries,
wherein the battery aggregates are disposed spaced apart, and
wherein a pair of the battery aggregates are arranged symmetrically with respect to each other, two of the at least two outlet portions are disposed at respective ends of the mounting portion, and the inlet portion is disposed at a center of the mounting portion, such that a flow path of the cooling medium moving through the inside of the mounting portion has a branched pattern that divides the flow path into two directions from a center of the space between the battery aggregates.

24. A secondary battery module comprising:
at least two battery aggregates each having a plurality of unit batteries continuously arranged, the battery aggregates being disposed symmetrically spaced apart from each other; and
a housing receiving the battery aggregates and circulating cooling medium between the unit batteries through the space between the battery aggregates, wherein the housing includes a mounting portion receiving the battery aggregates, an inlet portion having a wall around an axis that is substantially parallel to an arrangement direction of the unit batteries, the inlet portion for supplying the cooling medium to a space between the battery aggregates, and at least two outlet portions for discharging the cooling medium passed through the battery aggregates;
wherein each of the unit batteries of each of the battery aggregates is disposed in an oblique direction with respect to the arrangement direction of the unit batteries, and each of the battery aggregates includes a supporting unit closely contacting the unit batteries to each other to integrally support them, and
wherein a pair of the battery aggregates are arranged symmetrically with respect to each other, wherein two of the at least two outlet portions are disposed at respective ends of the mounting portion, and the inlet portion is disposed at a center of the mounting portion, such that a flow path of the cooling medium moving through the inside of the mounting portion has a branched pattern that divides the flow path into two directions from a center of the space between the battery aggregates.

* * * * *

UNITED STATES PATENT AND TRADEMARK OFFICE
CERTIFICATE OF CORRECTION

PATENT NO. : 7,662,508 B2  Page 1 of 1
APPLICATION NO. : 11/289133
DATED : February 16, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this

Thirtieth Day of November, 2010

David J. Kappos
*Director of the United States Patent and Trademark Office*